April 10, 1928.
R. CLADE ET AL
1,665,345
FILTER
Filed Aug. 13, 1926
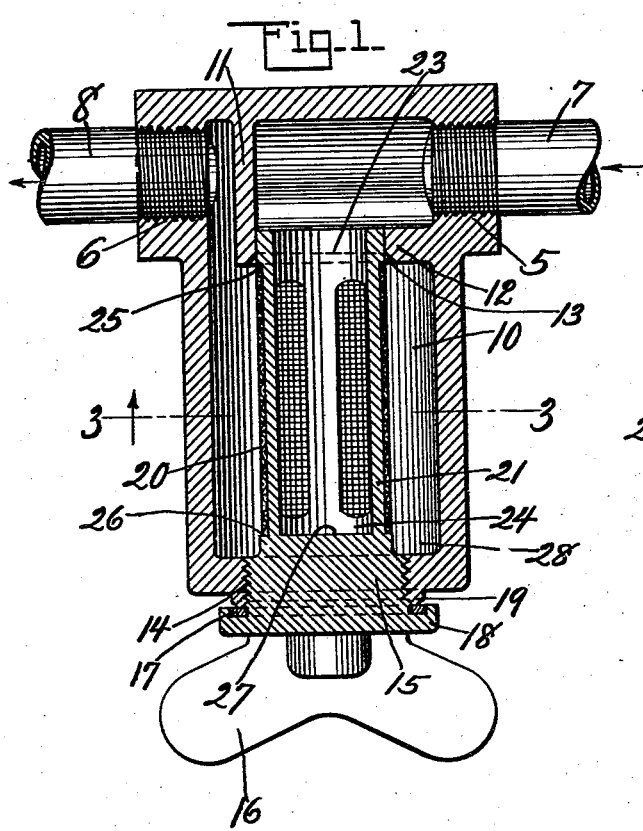
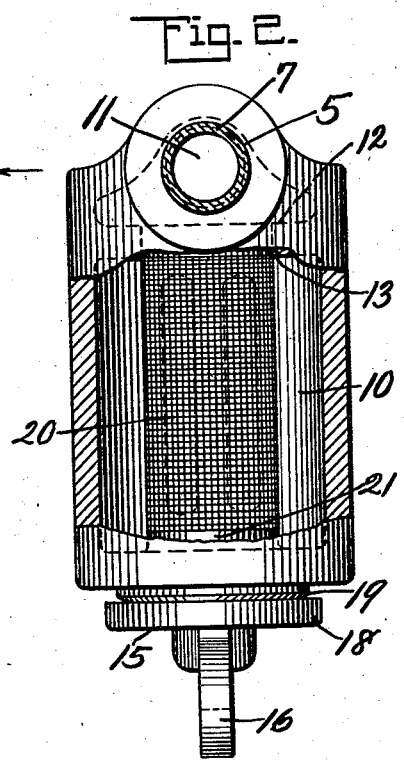
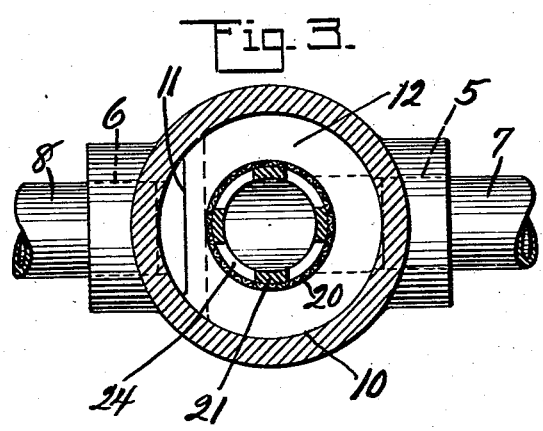
INVENTORS
Robert Clade, and
Henry B. Ensign
BY
ATTORNEY Patented Apr. 10, 1928.

1,665,345

UNITED STATES PATENT OFFICE.

ROBERT CLADE, OF NEWARK, NEW JERSEY, AND HENRY B. ENSIGN, OF ST. LOUIS, MISSOURI, ASSIGNORS TO AMERICAN CAR AND FOUNDRY COMPANY, OF NEW YORK, N. Y., A CORPORATION OF NEW JERSEY.

FILTER.

Application filed August 13, 1926. Serial No. 128,944.

Our invention relates to filters, our aim being to provide a simple and effective device that can be manufactured at relatively low cost, and can be easily and quickly opened, cleaned, and returned to service. The embodiment of our invention here shown and described is well suited for use in fuel oil lines and the like.

The accompanying drawings illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 shows a vertical mid-section through a filter or strainer conveniently embodying our invention.

Fig. 2 is an elevation at right angles to Fig. 1, with the center portion of the filter casing broken out and in vertical mid-section.

Fig. 3 is an inverted plan view with the device in horizontal section as indicated by line 3—3 in Fig. 1.

As here shown, the filter casing has screw threaded inlet 5 and outlet 6 for connection between pipe sections 7, 8 of an oil line. The inlet 5 and outlet 6 are shown at the upper part of the filter casing, in alignment with one another at opposite sides thereof, and the filter chamber 10 lies below them. The inlet and outlet 5, 6 are separated from one another by an internal dividing structure or partition, which also separates one of them (the inlet 5) from the filter chamber 10. As here shown, the partition comprises a vertical wall 11 opposite the outlet 6, and a horizontal wall 12 extending from the lower end of the wall 11 to the other side of the casing, below the inlet 5, with an opening 13 therein. At the bottom of the chamber 10, there is a clean-out opening 14 in the casing wall, opposite the opening 13 and in direct axial alinement therewith, but somewhat larger than the opening 13. This opening 14 is provided with a removable closure in the form of a screw plug 15. The plug 15 is shown as having a double wing handle 16 for screwing it home, and unscrewing it. A (lead) gasket 17 set into a groove in an external flange or shoulder 18 on the plug 15 seats against the narrow crest of a ridge or depending lip 19 on the bottom of the casing around the opening 14, and serves to make a tight joint.

The filter 20 is of hollow cylindrical form, and extends substantially from the bottom of the chamber 10 to the horizontal partition wall 12, around the opening 13 in the latter. It consists of wire gauze wrapped or mounted on a cylindrical openwork supporting structure or frame 21 that is carried by the plug 15. This frame 21 consists of longitudinals with annular connections 23, 24 at their upper and lower ends, and is shown as cast integral with the plug or cover 15. As shown in Fig. 1, the upper ring 23 is reduced in diameter at its lower portion to afford a shoulder 25 for the upper edge of the filter gauze 20, and there is a similarly formed shoulder 26 at the base of the lower ring 24. In the interior of the filter frame 21, the inner surface of the plug 15 is raised at 27 above the bottom of the filter chamber 10, so as to afford an annular sediment trough 28 in the bottom of the chamber 10 around the filter 20.

In operation, oil entering at the inlet 5 passes down through the opening 13 into the interior of the filter 20, out through the filter and up around it to the outlet 6. Grit or other such foreign matter in the oil is caught and held inside the filter 20, gradually accumulating there. Foreign matter that is fine enough to pass through the filter 20 tends to settle out around it, accumulating in the annular sediment trough 28. When it is desired to clean out the device, all that is necessary is to unscrew and remove the plug 15 and the filter 20 along with it: accumulated dirt in the interior of the filter 20 can then be removed by merely striking the filter frame 21 against any convenient solid structure. Sediment in the trough 28 will flow out through the opening 14 of itself when the plug 15 is withdrawn, or can readily be wiped out. After cleaning, the filter 20 can be replaced by merely inserting it and screwing home the plug 15. The threaded engagement of the plug 15 in the filter casing at 14 serves to aline the upper end 23 of the filter structure accurately with the opening 13 in which it seats, and the lower edge of this opening 13 may be bevelled as shown in Fig. 1 to assist in initially directing the structure 21 into it. As the structure 21 engages and seats freely in the opening 13 without encountering or bottoming against any shoulder or the like therein, even when the plug 15 is screwed tight home, variation in the position of the filter 20 due to wear of the gasket 17 (or to any other cause) will never prevent the plug 15 from being screwed tight home, or impose any longitudinal stress on the filter structure.

It will be seen that the device is simple, rugged, easy and convenient to install and keep in order, and very economical to manufacture, since the only portions or surfaces requiring any careful finish are the tapped openings in the filter casing and the surfaces involved in seating the structure 21 at 13 and in the mounting and seating of the gasket 17. Also, the filter gauze at 20 can be very easily removed and replaced when worn out or otherwise deteriorated.

What is claimed is:

1. In a filter comprising a casing having a partitioned upper end defining an inlet chamber and an outlet passage, said inlet chamber being provided with an apertured base portion, a filtering tube in said casing and consisting of a solid plug for closing the open end of said casing, said plug having a reduced inner end extending into the casing and defining with the casing a sediment receiving portion therebetween, an open frame carried by said reduced end and terminating at its upper end in a retaining flange positioned within the apertured base of the inlet chamber, and a filtering medium secured around the outside of said frame and extending from the upper surface of the reduced end of the plug to the flanged end of said frame, the upper surface of the reduced inner end forming the bottom of the filtering tube.

2. In a filter comprising a casing having a partitioned upper end defining an inlet chamber and outlet passage, said inlet chamber having an apertured base, a filtering tube in said casing comprising a solid plug for closing the open end of the casing, said plug having a reduced end extending into the casing, the sides thereof defining with the casing an outer sediment receiving chamber, an open frame carried by the reduced end and terminating at its upper end in a retaining flange positioned within the aperture in the base of the inlet chamber, and a filtering medium secured around the outside of the open frame extending from the upper surface of the reduced end of the plug to the flanged end of the frame, the upper surface of the reduced end of the plug forming the bottom of the filtering tube and providing with the filtering medium an inner sediment receiving chamber.

3. In a filter having a casing with a partitioned upper end defining an inlet chamber and an outlet passage, said inlet chamber having an apertured base, a filtering tube in said casing comprising a solid plug for closing the open end of the casing, said plug having a reduced end extending into the casing and provided with an annular flange, the sides of said reduced end defining with the casing an outer sediment receiving chamber, uprights extending from the annular flange, an annulus connecting the upper ends of said uprights and positioned within the aperture in the base of the inlet chamber, and a filtering medium secured around the uprights and annular flange, the upper surface of the reduced end of the plug forming the bottom of the filtering tube and providing with the annular flange an inner sediment receiving chamber.

In witness whereof I have hereunto set my hand.

ROBERT CLADE.

In witness whereof I have hereunto set my hand.

HENRY B. ENSIGN.